US 6,672,874 B2

(12) United States Patent
Guthrie

(10) Patent No.: US 6,672,874 B2
(45) Date of Patent: Jan. 6, 2004

(54) ELECTRICAL CONNECTION STRUCTURE IN A MOTOR VEHICLE

(75) Inventor: Paul Wiliam Guthrie, Regensburg-Grass (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/068,722

(22) Filed: Feb. 6, 2002

(65) Prior Publication Data

US 2002/0132499 A1 Sep. 19, 2002

(30) Foreign Application Priority Data

Feb. 6, 2001 (DE) .......................... 101 05 366

(51) Int. Cl.⁷ .............................................. H01R 33/00
(52) U.S. Cl. ..................... 439/34; 439/502; 307/10.1
(58) Field of Search ................. 439/34, 502; 307/10.1

(56) References Cited

FOREIGN PATENT DOCUMENTS

DE        199 23 893 A1    11/2000
EP        0 857 618 A2     8/1998

Primary Examiner—Gary Paumen
(74) Attorney, Agent, or Firm—Laurence A. Greenberg; Werner H. Stemer; Ralph E. Locher

(57) ABSTRACT

The invention relates to an electrical connecting structure for electrically connecting electrical and electronic components of a motor vehicle (2) to an electrical cable harness (8) mounted in the motor vehicle (2), the cable harness (8) comprising the following: a first central electrical plug-type connection terminal (10) for connecting the cable harness (8) to a central electronic engine controller (4) which is mounted in the vehicle body separately from an internal combustion engine (6), and a second central electrical plug-type connection terminal (12) to form a central corresponding plug (14) of the internal combustion engine (6) which corresponds to said plug-type connection terminal (12).

4 Claims, 1 Drawing Sheet

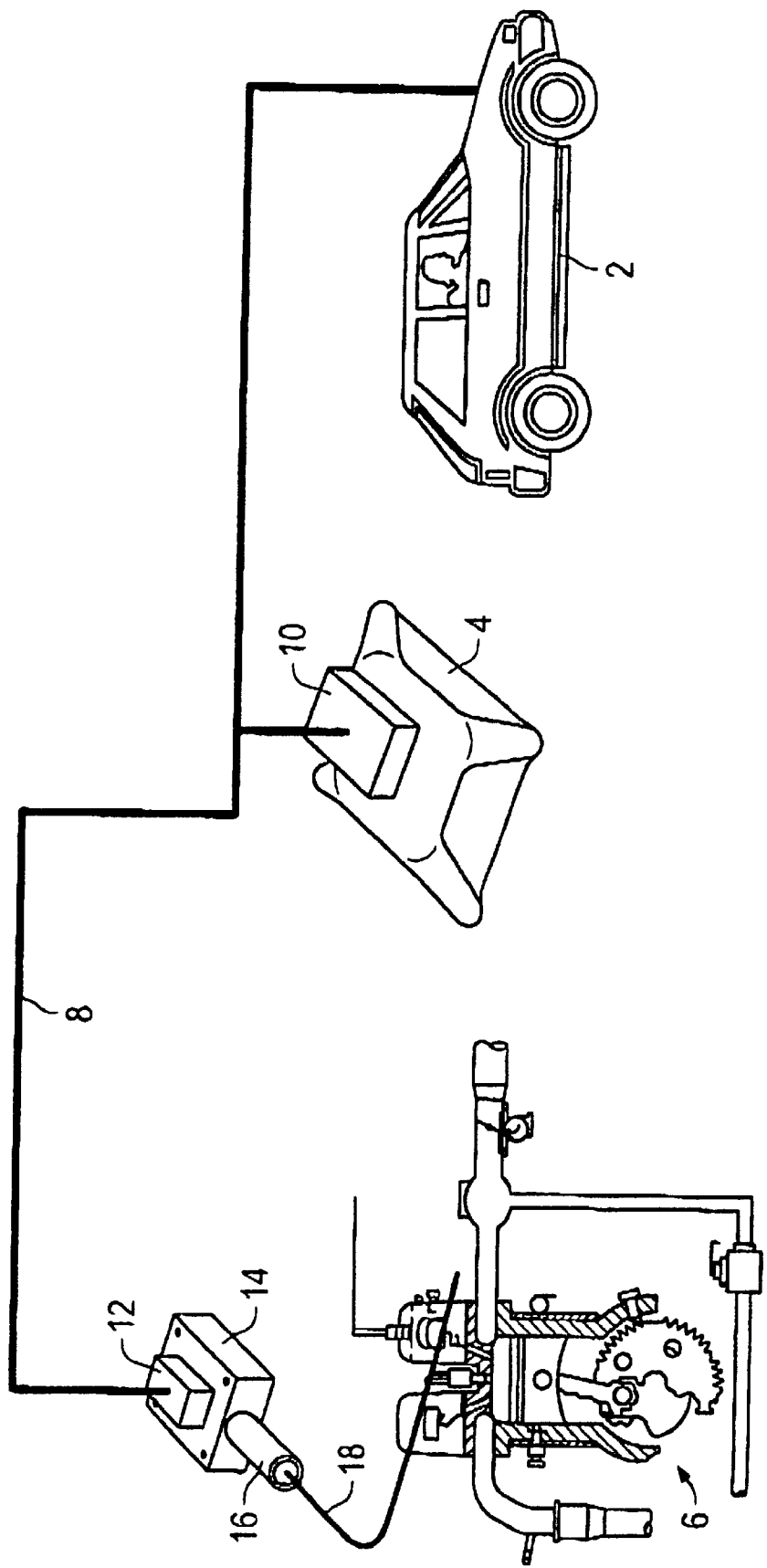

ELECTRICAL CONNECTION STRUCTURE IN A MOTOR VEHICLE

BACKGROUND OF THE INVENTION

Field of the Invention

The invention relates to an electrical connecting structure in a motor vehicle for electrically connecting components of the motor vehicle to a cable harness, and to a method for functionally checking an internal combustion engine at the end of the mounting conveyor belt of a mounting line.

The configuration of an electrical cable harness for connecting all the electrical components of a motor vehicle depends in particular on the installation location of the engine controller and on the test strategy with which, after the mounting of the internal combustion engine for the motor vehicle, its operational capability is checked and tested. Here, basically two different strategies for the functional testing of internal combustion engines after they have been mounted are known in the vehicle industry.

When there is a cable harness structure for an installation location of the engine controller which is separated from the internal combustion engine, the engine controller is normally not available for functional checking at the end of the mounting conveyor belt of the internal combustion engine. For this reason, the functional checking of the internal combustion engine typically takes place in the state in which it is already installed in the motor vehicle, which has the disadvantage that when faulty functioning is detected the internal combustion engine has to be removed from the motor vehicle again and transported for disassembly and/or for further checking to another location in the fabrication line.

Another cable harness structure in which the engine controller is arranged directly on the internal combustion engine in the engine compartment, and is thus already available for functional checking at the end of the conveyor belt of the mounting line is also known. This availability for functional checking is at the same time one of the most important reasons why engine controllers are often mounted directly on the internal combustion engine. A disadvantage however with this installation location are the temperature and ambient influences which act on the engine controller and which make sealed encapsulation and shielding of this component necessary. A further disadvantage of the installation location in the engine compartment is that it is usually not possible to employ any universal software in the test unit for the functional checking of various types of engine, and instead the software has to be adapted to each type of engine, and thus also to each engine controller.

SUMMARY OF THE INVENTION

The object of the present invention is to make available an electrical connecting structure, and in particular a cable harness structure, in a motor vehicle which permits simple and reliable functional checking at the end of the mounting conveyor belt of an internal combustion engine.

This object of the invention is achieved with an electrical connecting structure for electrically connecting electrical and electronic components of a motor vehicle to an electrical cable harness mounted in the motor vehicle is provided. This cable harness comprises a first central electrical plug-type connection terminal for connecting the cable harness to a central electronic engine controller which is mounted in the vehicle body separately from an internal combustion engine.

In addition, the cable harness comprises a second central electrical plug-type connection terminal to form a central corresponding plug of the internal combustion engine which corresponds to said plug-type connection terminal. Such a structure has the advantage that, on the one hand, the engine controller and internal combustion engine can be installed separately from one another in the vehicle, which is advantageous in particular owing to the costly shielding with respect to temperature and ambient influences, which can thus be dispensed with. In addition, with such a structure there is the simple possibility of performing functional checking of the internal combustion engine after it has been mounted by connecting a test unit to a central electrical plug-type connection terminal on the internal combustion engine. This test unit for checking at the end of the conveyor belt can be operated with universal software because adaptation to various engine types can be carried out very easily.

By virtue of the fact that the cable harness can have a vehicle-specific design, simple adaptation to a wide variety of types of vehicle is possible, at the same time enabling the internal combustion engine to be connected universally both to the different types of cable harness and to the test device for checking at the end of the conveyor belt.

Because the central electrical engine controller can be mounted at an installation location in the vehicle body which is protected from temperature and ambient influences, there is no need for any costly shielding measures as against an installation location in the engine compartment.

The use of standardized plugs for the central corresponding plug of an internal combustion engine provides, in particular, the advantage that a high degree of standardization is possible both when different cable harnesses are used for the wide variety of vehicles and for the electrical connection to test units for functional checking.

In a further refinement of the invention there is provision for the central corresponding plug of the internal combustion engine to be placed at a standardized installation location. That is to say it is largely located always at the same point, even with different types of engine, as a result of which in particular the advantage of a large degree of automation of the functional checking after the internal combustion engine has been mounted is made possible.

Finally, a further embodiment of the invention provides for the connecting section of the cable harness to have a vehicle-specific minimum length between the second central electrical plug-type connection terminal of the internal combustion engine and the first central electrical plug-type connection terminal for the connection of the cable harness to a central electronic engine controller. This has in particular the advantage that no excessively costly shielding measures for the cable connection between the internal combustion engine and engine controller are necessary. Such shielding measures are necessary and prescribed owing to the requirement for electromagnetic compatibility (EMC) of all electronic components in the motor vehicle.

A further object of the invention is to make available a simple method, which can be automated, for functional checking of an internal combustion engine after it has been mounted.

This object of the invention is achieved with a method for the functional checking of an internal combustion engine which is provided for installation in a motor vehicle directly after it has been mounted and before its installation in the motor vehicle to comprise at least the following steps: directly after it has been mounted and before its installation in the motor vehicle, an electrical connection is produced between a standardized central corresponding plug for the electrical connection of the internal combustion engine to a central plug-type connection terminal, corresponding thereto, of a vehicle-specific cable harness and a test device. This test device is capable of simulating various operating states and functional checking of the internal combustion engine and running through different test programs. The results of the functional checking are logged here and it is subsequently possible to take a decision about the freedom from faults of the internal combustion engine. Before its transportation onward to the envisaged mounting location in the motor vehicle, internal combustion engines which are assessed as being faulty can be separated off. This method has the advantage that it can be automated to a high degree and at the same time has a large degree of universality because the wide variety of types of internal combustion engine can easily be connected using respectively standardized electrical plug-type connection terminals to a test unit whose test software can easily be adapted to the respective type of engine.

Further advantageous developments of the invention can be found in the dependent claims and the following description of the figures.

The invention is explained in more detail below by means of a preferred exemplary embodiment and with reference to the drawing.

BRIEF DESCRIPTION OF THE DRAWINGS

The single FIGURE shows a schematic basic diagram of an electrical connecting structure with a cable harness for a motor vehicle.

DESCRIPTION OF THE PREFERRED EMBODIMENTS

The FIGURE shows a schematic view of a motor vehicle 2 with an electronic engine controller 4 arranged therein and a cable harness 8 for electrically connecting all the electrical and electronic components in the motor vehicle 2. In the illustrated exemplary embodiment, the engine controller 4 is located at an installation location in the vehicle body which is separated from the internal combustion engine because, in this way, there is no need for excessively costly shielding against temperature and ambient influences. The basic diagram of the FIGURE also shows an internal combustion engine 6 before the installation in the motor vehicle 2, which internal combustion engine 6 is subjected to functional checking after it has been mounted. An electrical corresponding plug 14 which is mounted permanently on the internal combustion engine 6 can be connected in the installed state of the internal combustion engine 6 in the motor vehicle 2 to a second electrical plug-type connection terminal 12 of the cable harness 8 which appropriately corresponds to said electrical corresponding plug 14, and is thus electrically connected to the engine controller 4 and further components of the motor vehicle 2. The engine controller 4 is also connected to the cable harness 8 using a first central electrical plug-type connection terminal 10 of said cable harness 8, and said engine controller 4 thus has an electrical connection to the internal combustion engine 6 and to further components of the motor vehicle 2.

A connecting section 16, which opens into the corresponding plug 14 and which couples the electronic components of the internal combustion engine 2 to the engine controller 4 via the connecting section 16, the corresponding plug 14 and the cable harness 8 via a connecting line 18 to the internal combustion engine 2. An essential factor contributing to the simple and standardized structure is that the corresponding plug 14, connecting section 16 and connecting line 18 are embodied in one piece, and that the corresponding plug 14 is permanently mounted at a defined installation location on the internal combustion engine 6. The corresponding plug 14 can be composed, for example, of plastic and be manufactured in injection molding method. The connecting section 16 serves essentially as a mechanical protection for the connecting line, for example as a protection against bending and/or a tensile strain relief.

The section of the cable harness 8 between the first electrical plug-type connection terminal 10 and second electrical plug-type connection terminal 12 is made as short as possible so that shielding measures which are necessary for electromagnetic compatibility (EMC) do not have to be too complex. The cable harness 8 is generally a vehicle-specific component which can be embodied differently for each type of vehicle. The cable harness 8 is also typically configured individually for different equipment variants of a single type of vehicle. However, the first and second plug-type connection terminals 10, 12 are always embodied in the same way, preferably as standardized parts. This makes it possible for the engine controller 4 to be exchanged easily, and in particular for the functional checking of the internal combustion engine 6 after it has been mounted to be automated by means of a third plug-type connection terminal (not illustrated here) of a test device (not illustrated here either), said plug-type connection terminal corresponding to the corresponding plug 14.

The functional checking of the internal combustion engine 6 after it has been assembled and before it is mounted in the motor vehicle 2 can easily be carried out using the standardized corresponding plug 14 and the third plug-type connection terminal which fits it, as well as a connecting line to the test device at the end of the mounting conveyor belt. During the functional checking, a multiplicity of possible operating states of the internal combustion engine can occur by means of a program which runs on the test device. This program can easily be adapted to different types of engine. The results of the functional checking can be logged and archived for later monitoring, statistical evaluation and verification of the test runs. By means of the test results it is already possible to assess, directly at the end of the mounting conveyor belt, whether an internal combustion engine which is provided for installation in a motor vehicle is free of faults or whether it has to be separated off for subsequent processing or, if appropriate, for complete disassembly. This testing and selection method can easily be run through in a completely automated sequence.

I claim:

1. In an electrical connecting structure for electrically connecting electrical and electronic components of a motor vehicle, the motor vehicle having an internal combustion engine with a standardized central counterplug permanently mounted at a standardized installation location and having a central electronic engine controller, a cable harness assembly, comprising;

a cable harness mounted in the motor vehicle;

a first central electrical plug connection terminal for connecting said cable harness to the central electronic engine controller mounted in the vehicle body separately from the internal combustion engine; and a second central electrical plug connection terminal for connecting said cable harness to the standardized central counterplug permanently mounted at the standardized location on the internal combustion engine corresponding to said second plug connection terminal.

2. The electrical connecting structure according to claim 1, wherein said cable harness is configured with a vehicle-specific configuration.

3. The electrical connecting structure according to claim 1, wherein the central electronic engine controller is mounted at an installation location in the vehicle body that is protected from temperature and ambient influences.

4. The electrical connecting structure according to claim 1, wherein said cable harness has a connecting section with a vehicle-specific minimum length between said second central electrical plug connection terminal and said first central electrical plug connection terminal.

* * * * *